United States Patent Office

2,942,066
Patented June 21, 1960

2,942,066

METHOD OF PROVIDING A LECTURE TOUR OF MUSEUMS AND THE LIKE

Benjamin Margolin, 3511 30th St. NW., Washington, D.C.

No Drawing. Filed Apr. 28, 1958, Ser. No. 731,085

5 Claims. (Cl. 179—1)

Many museums, art galleries, and other establishments and institutions organized or formed for the display of various items of public interest, provide, as a usual function of their operation, guided lecture tours of the items of interest on display or contained in the establishment. These lecture tours are generally personally conducted by a guide who directs the tour with an assemblage of patrons. Consequently, the tour must be prescribed in advance to cover a certain schedule of items in a predetermined order and over a preestablished period of time. Accordingly, each patron is constrained to proceed through the tour at the prescribed rate and in accordance with the prescribed schedule of items.

The present invention seeks to overcome the rigidity of a prescribed lecture tour schedule, and to afford to each patron complete flexibility as to the rate at which he proceeds through the tour, and the sequence or order of items which he covers in his tour. In other words, the present invention is designed to afford to the patron complete autonomy as to when he shall receive a guide lecture on any item on the lecture tour, which of said items he wishes to include in his tour, in what order he shall view said items, and how much time he shall devote to viewing said items. The present invention accordingly provides what may be described as a personalized lecture tour whose pace and schedule is determined by the patron, and not prescribed by the establishment, as is essential in the case of conventional group lecture tours.

It is therefore one object of the present invention to provide for lecture tours of an establishment having numerous items of interest to a patron, wherein the lecture tour schedule is determined by the patron.

Another object of the present invention is to provide lecture tours of an establishment having numerous items of interest to patrons of the establishment, wherein each patron individually effects his own tour, and obtains a lecture on each of said items in accordance with his own chosen schedule.

Other objects and advantages of the present invention will become apparent to those skilled in the art from a consideration of the following specific description thereof.

It is contemplated that the present invention will find utility in almost any environment wherein numerous items of interest are on display, and wherein an oral lecture may profitably accompany the patrons' viewing of the items. However, since the invention is most eminently suited for use in an environment such as an art museum, which is normally divided into a plurality of rooms or galleries each containing several paintings on display, the present invention will here be described particularly in connection with that environment, although it is not limited thereto.

Accordingly, for the purposes of the present description, there is provided within an art museum a plurality of galleries to which a lecture tour is directed in accordance with the present invention. Within each of said galleries several paintings are made the subject of the lecture tour. For each gallery a recording of an oral lecture is made, preferably although not necessarily on magnetic recording tape, describing or otherwise treating, in sequence, the several paintings therein selected as the subject of the lecture tour. The lecture recording for each gallery is separate from and independent of the lecture recording for each other gallery. By any convenient and well known means, each of said recorded lectures is repetitively and continuously transmitted into its respective gallery, while the other recorded lectures are simultaneously similarly transmitted into their respective galleries. In order not to interfere with patrons not wishing to partake of the lecture tour, and to minimize and eliminate interference of one lecture with that in an adjacent or nearby gallery, the transmission of the lecture into the gallery is preferably not in direct audio sonic form, but may be transmitted into the gallery as a modulated magnetic field, modulated radio energy, or a modulated superaudible sound wave. Accordingly, each patron is provided with a portable miniature receiver adapted to receive the transmitted energy and convert it into audible sonic intelligence received by the patron through an earphone.

Thus, in accordance with the present invention, each or selected ones of the galleries of a museum simultaneously, continuously, and repetitively receive a lecture on the items or selected items contained in said gallery. The lecture being conducted in each such gallery is completely independent of that conducted in each of the other galleries. Further, since each of the items concerned in each gallery is treated in sequence, the lecture with respect to each individual item is a separate intelligible entity in itself.

As previously stated, the primary purpose of the present invention is to permit a patron to individualize his lecture tour of the museum. From the foregoing description, it is apparent that each patron may go to any gallery of his choosing, and may attend the galleries in any sequence he wishes. Further, if he desires, he may remain in any desired gallery and hear the lecture there repeated as many times as he wishes. Further, since the lecture with respect to each of the items within a gallery is independent of the lecture preceding and following with respect to the other items in that gallery, the patron can commence picking up the lecture at any item being treated when he enters the gallery. The patron is thus afforded complete autonomy in the conduct of his personalized lecture tour of the museum.

As is further apparent in view of the foregoing description, more than one lecture may be simultaneously transmitted into any gallery, with the different lectures being carried on different frequencies, wavelengths, etc. of the transmitting energy, with the individual patron receivers tuned to pick up only the one of the lectures desired. By this expedient different lectures directed to different audiences may be simultaneously rendered. For example, one lecture may be directed to the level of the average adult art viewer, a second lecture to the level of children, and a third lecture to the level of art students.

The foregoing description affords the general and basic principles of the present invention. From study and observation of the duration of interest of museum patrons, combined with the considerations of individualized flexibility which it is the purpose of the present invention to effect, certain criteria have been determined with respect to the duration of each lecture for a gallery as a whole, and with respect to the duration of the lecture for each item within the gallery. It is preferred that the entire lecture for each gallery be no longer than approximately fifteen minutes, and that the commentary on each item treated in that lecture be about one and one half minutes. Allowing some time for independent viewing of each item by the patron, and for transition of his attention from one item to the next item in the gallery, the lecture for each gallery should be confined to about six items.

It is understood that in the foregoing specific description the choice of an art museum environment is merely exemplary, and that the present invention is equally well suited to other environments, such as other types of museums, areas of natural phenomena of public viewing interest, and generally such establishments as provide separate areas containing items of interest to observers, where an oral commentary would enhance the enjoyment and value to the observer of the items concerned. Accordingly, various modifications and adaptations of the present invention will probably be apparent to those skilled in the art, particularly as the invention is tailored to the needs of various environments; and such modifications and adaptations as are embraced within the spirit and scope of the appended claims are contemplated by the present invention and are considered within the purview thereof.

What is claimed is:

1. A method of providing a lecture tour of an establishment having a plurality of items of viewing interest, wherein said establishment has a plurality of different areas, and a plurality of said items displayed for viewing in each of said areas; comprising, repetitively and continuously transmitting simultaneously to each of said areas different recorded commentaries on items of viewing interest contained in each respective area, the commentary transmitted for each such area being independent of the commentaries transmitted for each of the other areas and treating the items in such area separately and in sequence, disseminating into each area in non-audible form its respective commentary, and converting said disseminated commentaries into audible form by means of individual receivers carried by the viewers, whereby a viewer may at any time enter any one of said areas and intelligently pick up the disseminated commentary, or any portion thereof, for that area, whether at the beginning, end, or intermediate portion thereof, and the commentaries thus disseminated do not interfere with those viewers not desirous of receiving such commentaries.

2. A method as set forth in claim 1, wherein a plurality of commentaries are simultaneously transmitted for and disseminated in non-audible form into each area in forms separately detectable by said receivers.

3. A method as set forth in claim 1, wherein the entire recorded commentary transmitted for and disseminated into each area is no longer than approximately fifteen minutes.

4. A method as set forth in claim 3, wherein the duration of commentary with respect to an individual item is about one and one half minutes.

5. A method as set forth in claim 4, wherein the commentary for each area covers no more than about six items.

References Cited in the file of this patent

UNITED STATES PATENTS 2,721,896   Foot _____ Oct. 25, 1955

OTHER REFERENCES

Electrical Engineering, December 1939, pp. 509–511.